Figure 1:
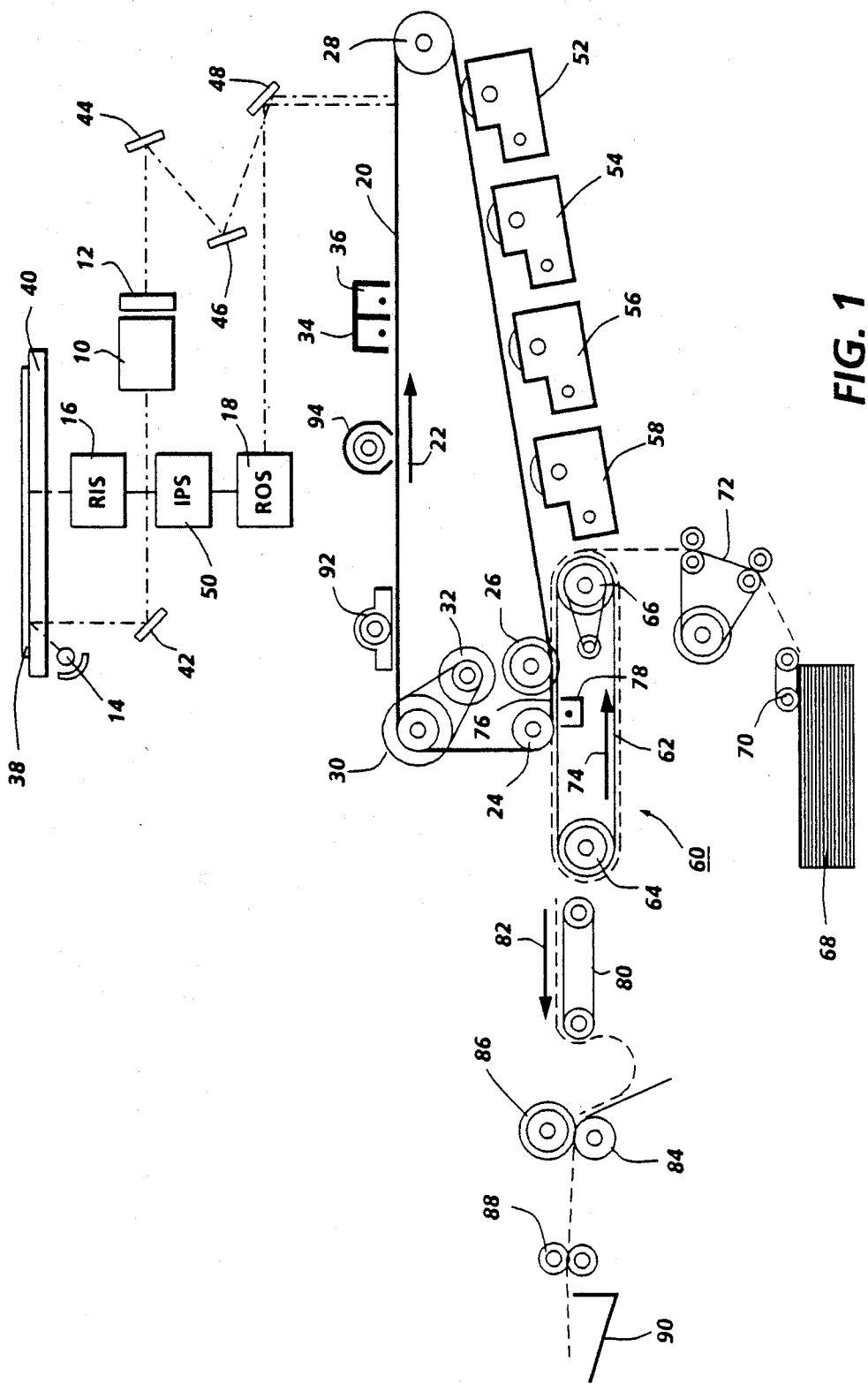

United States Patent [19]
Birnbaum et al.

[11] Patent Number: 4,970,562
[45] Date of Patent: Nov. 13, 1990

[54] COLOR IMAGE PROCESSING APPARATUS

[75] Inventors: David Birnbaum, Pittsford; Lee A. Cass, Rochester; Timothy M. Hunter, Webster; Larry A. Kovnat, Rochester; Paul G. Roetling, Ontario, all of N.Y.

[73] Assignee: Xerox Corporation, Stamford, Conn.

[21] Appl. No.: 355,260

[22] Filed: May 22, 1989

[51] Int. Cl.$^5$ .................................. G03G 15/01
[52] U.S. Cl. ................... 355/327; 355/218; 346/157
[58] Field of Search ............. 355/218, 326, 327, 202, 355/328; 346/153.1, 157; 358/75, 79, 80

[56] References Cited

U.S. PATENT DOCUMENTS

| | | | |
|---|---|---|---|
| 4,236,809 | 12/1980 | Kermisch | 355/4 |
| 4,469,433 | 9/1984 | Kurata et al. | 355/4 |
| 4,642,681 | 2/1987 | Ikeda | 358/79 |
| 4,663,662 | 5/1987 | Sekizawa et al. | 358/75 |
| 4,680,625 | 7/1987 | Shoji et al. | 358/80 |
| 4,682,216 | 7/1987 | Sasaki et al. | 358/79 |
| 4,690,543 | 9/1987 | Watanabe | 355/4 |
| 4,700,399 | 10/1987 | Yoshida | 382/17 |
| 4,718,040 | 1/1988 | Ayata et al. | 364/900 |

FOREIGN PATENT DOCUMENTS

| | | | |
|---|---|---|---|
| 62-95557 | 5/1987 | Japan | 355/218 |
| 62-200374 | 9/1987 | Japan | 355/218 |
| 63-135962 | 6/1988 | Japan | 355/218 |
| WO87/03707 | 6/1987 | PCT Int'l Appl. | 355/218 |

Primary Examiner—R. L. Moses
Attorney, Agent, or Firm—H. Fleischer; J. E. Beck; R. Zibelli

[57] ABSTRACT

A color image processing apparatus in which a latent image corresponding to one of the color components of an original document is recorded on an image receiving member. The original document is scanned and a plurality of color components of the original document are detected. Color signals, representative of each one of the plurality of color components detected, are generated. As the latent image is being recorded on the image receiving member, those regions of the latent image wherein the color signals have a preselected relationship to one another are erased.

25 Claims, 2 Drawing Sheets

COLOR IMAGE PROCESSING APPARATUS

This invention relates generally to a color image processing apparatus, and more particularly concerns an apparatus which determines the black regions of a latent image.

Frequently, an electrophotographic printing machine is used to process color original documents and form color copies thereof. In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a powder image on the photoconductive member which is subsequently transferred to a copy sheet. The copy sheet is heated to permanently affix the marking particles thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complementary thereto. This process is repeated a plurality of cycles for differently colored images and their respective complementarily colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid material or a powder material.

A major problem in color copiers has been their dependence on creating black from the three primary colors. This process black tends to often appear to be dark brown or purple. In addition, mis-registration between the three color passes degrades the black representation. In the printing industry, this problem is resolved by a technique termed undercolor removal. In this technique, the black portions are removed and subsequently formed with a single color black. This is particularly advantageous for reproducing text information in a graphics document, since the single color black will result in higher quality copies than when the black text is produced by process black. Thus, it is highly desirable to be capable of removing those portions of the latent image corresponding to black so that a single color black latent image may be formed eliminating the need to produce a process black. Various approaches have been devised for achieving the foregoing. The following disclosure appears to be relevant:

U.S. Pat. No. 4,236,809
Patentee: Kermisch
Issued: Dec. 2, 1980
U.S. Pat. No. 4,469,433
Patentee: Kurata et al.
Issued: Sept. 4, 1984
U.S. Pat. No. 4,642,681
Patentee: Ikeda et al.
Issued: Feb. 10, 1987
U.S. Pat. No. 4,663,662
Patentee: Sekizawa et al.
Issued: May 5, 1987
U.S. Pat. No. 4,680,625
Patentee: Shoji et al.
Issued: Jul. 14, 1987
U.S. Pat. No. 4,682,216
Patentee: Sasaki et al.
Issued: Jul. 21, 1987
U.S. Pat. No. 4,690,543
Patentee: Watanabe
Issued: Sept. 1, 1987
U.S. Pat. No. 4,700,399
Patentee: Yoshida
Issued: Oct. 13, 1987
U.S. Pat. No. 4,718,040
Patentee: Ayata et al.
Issued: Jan. 5, 1988

The relevant portions of the foregoing patents may be briefly summarized as follows:

U.S. Pat. No. 4,236,809 discloses an electrophotographic copier in which an optical latent image is corrected for tone or color by a raster latent image. A raster input scanner, processor and raster output scanner are arranged in parallel with the optical system. The raster input scanner generates an electrical raster image signal representative of the original. The processor converts electrical correction signals as a function of the raster image signals. The raster output scanner generates a raster latent image in registration with the optical latent image in response to the electrical correction signals.

U.S. Pat. No. 4,469,433 describes a color copying machine having a color sensor coupled to logic circuitry to determine when black ink is to be used to simulate the color of the original.

U.S. Pat. No. 4,642,681 discloses a color iamge processing system capable of recognizing a black area by reading the output of a plurality of color detectors. Based on detection of black, color developing is inhibited in favor of a black signal.

U.S. Pat. No. 4,663,662 describes a picture processing system in which a continuous color picture is formed from dots. The processing system images the color information signals so that the bi-level or dithered signals of the averaged color information signals are supplied to the picture output device.

U.S. Pat. No. 4,680,625 discloses a color corrector, which based upon detection of the light reflected from the original document, determines the local black component of the color and operationally controls development to reflect the component in the form of a black developer.

U.S. Pat. No. 4,682,216 describes an image processing system which duplicates originals based on information gathered by a plurality of specialized document color detectors. The system determines the process to be used, i.e. process black or straight black, in developing the copies.

U.S. Pat. No. 4,690,543 discloses a copier having a red developer unit and a black developer unit. A charge coupled device is used to detect the red and black regions of the original document. The red portion of the latent image is erased and the latent image is developed with black toner. The next latent image has the black portion erased and the remaining portion of the latent image is developed with red toner. The black and red regions are identified during one or more pre-scan passes. Their locations are stored in memory.

U.S. Pat. No. 4,700,399 describes a color image processor which detects an edge of an image and controls black reproduction quantity to provide a detail area in a shadow area or a black character in a color image by increasing the proportion of black produced by the undercolor removal process.

U.S. Pat. No. 4,718,040 discloses a printing system using charge coupled devices for reading image data from an original. The image data is stored in a memory. A red image is reproduced with lower resolution than a black image.

Pursuant to the features of the present invention, there is provided a color image processing apparatus including an image receiving member. Means are provided for supporting an original document. Means record a latent image on the image receiving member corresponding to one of the color components of the original document of the supporting means. Means scan the original document on the supporting means and detect a plurality of color components of the original document to generate color signals representative of each one of the plurality of color components. Means, responsive to the color signals from the scanning means, erase, as the latent image is being recorded on the image receiving member, those regions of the latent image wherein the color signals from the scanning means have a preselected relationship relative to one another.

In another aspect of the present invention, there is provided an electrophotographic printing machine of the type having a photoconductive member arranged to have a latent image of an original document recorded thereon. The improvement includes means for recording a latent image on the photoconductive member corresponding to one of the color components of the original document. Means scan the original document and detect a plurality of color components of the original document to generate color signals representative of each one of the plurality of color components. Means, responsive to the color signals from the scanning means, erase, as the latent image is being recorded on the photoconductive member, those regions of the latent image wherein the color signals from the scanning means have a preselected relationship relative to one another.

Figure 2:
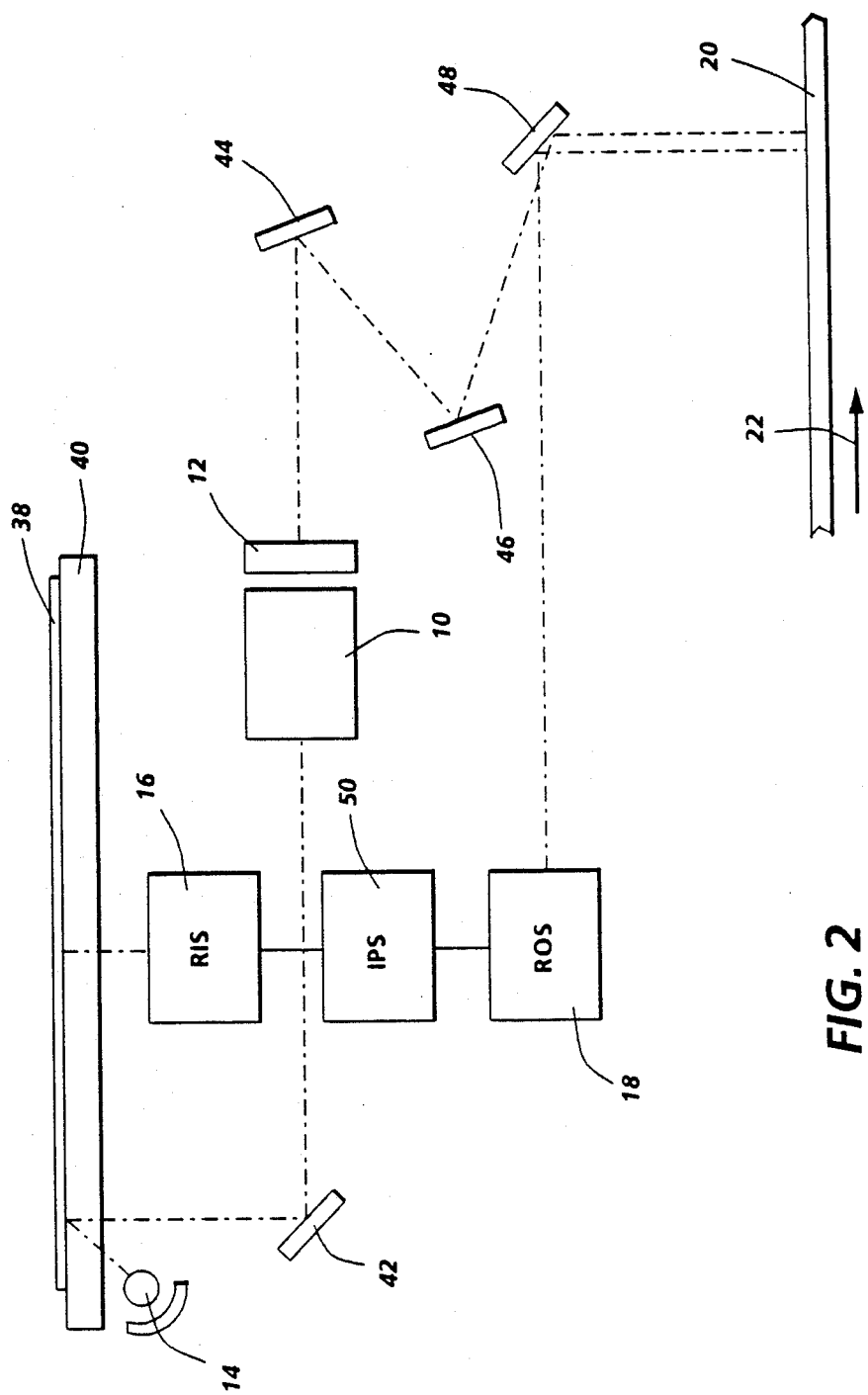

Other aspects of the present invention will become apparent as the following description proceeds and upon reference to the drawings, in which:

FIG. 1 is a schematic elevational view showing an illustrative electrophotographic printing machine incorporating the features of the present invention therein; and FIG. 2 is a schematic elevational view depicting the optical and raster scanning system used in the FIG. 1 printing machine.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like reference numerals, have been used throughout to designate identical elements. FIG. 1 is a block diagram of an illustrative electrophotographic printing machine incorporating the features of the present invention therein. It will become evident from the following discussion that the present invention is equally well suited for use in a wide variety of printing systems, and is not necessarily limited in its application to the particular systems shown herein.

Referring not to FIG. 1, there is shown the electrophotograhic printing machine employing a photoconductive belt 20. Preferably, the photoconductive belt 20 is made from a photoconductive material coated on a grounding layer, which, in turn, is coated on an anti-curl backing layer. The photoconductive material is made from a transport layer coated on a generator layer. The transport layer transports positive charges from the generator layer. The interface layer is coated on the grounding layer. The transport contains small molecules of di-m-tolydiphenylbiphenyldiamine dispersed in a polycarbonate. The generation layer is made from trigonal selenium. The grounding layer is made from a titanium coated Mylar. The grounding layer is very thin and allows light to pass therethrough. Other suitable photoconductive materials, grounding layers, and anti-curl backing layers may also be employed. Belt 20 moves in the direction of arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, two corona generating devices, indicated generally by the reference numerals 34 and 36, charge photoconductive belt 20 to a relatively high, substantially uniform potential. Corona generating device 34 places all of the required charge on photoconductive belt 20. Corona generating device 36 acts as a leveling device, and fills in any areas missed by corona generating device 34.

Next, the charged photoconductive surface is rotated to the exposure station. At the exposure station, original document 38 is positioned on transparent platen 40. The exposure station includes an optical scanning system and a raster scanning system. The optical scanning system includes a moving lens system, generally designated by the reference numeral 10, and a color filter mechanism, shown generally by the reference numeral 12. An original document 38 is supported on a transparent viewing platen 40. Successive incremental areas of the original document are illuminated by means of a moving lamp assembly, shown generally by the reference numeral 14. Lens system 10 is adapted to scan successive areas of illumination of platen 40 and to focus the light rays on photoconductive surface 12. Lamp assembly 14 and lens system 10 are moved in a timed relationship with respect to the movement of belt 20 to produce a flowing light image of the original document on photoconductive surface 20 in a non-distorted manner. During exposure, filter mechanism 12 interposes selected color filters into the optical light path of lens 10. The color filters operate on the light rays passing through the lens to record an electrostatic latent image on the photoconductive surface corresponding to a specific color of the flowing light image of the original document. Mirrors 42, 44, 46 and 48 reflect the light image onto the charged portion of the photoconductive belt 20 to selectively discharge the charge thereon forming a charge pattern corresponding to a single color of the original document, i.e. a single color latent image. Successive latent images are recorded on photoconductive belt 20 with different color optical filter 12. A red colored filter, a green colored filter and a blue colored filter are used. When an electrostatic latent image is formed by passing the light image through a red filter, the green and blue portions of the spectrum will record as areas of relatively high charge density on photoconductive belt 20, while the red light rays will pass through the filter and cause the charge density on the photoconductive belt 20 to be reduced to a voltage level ineffective for development. In this way, the charged area on photoconductive belt 20 is a single color latent image corresponding to the substractive primary of red, i.e. cyan. A green filtered light image will cause the charge density of the photoconductive belt 20 to be reduced to a voltage level ineffective for development in the green areas while the blue and red portions of the spectrum will record as areas of relatively high charge density on photoconductive belt 20 to form a single color latent image corresponding to the subtractive primary of green, i.e. magenta. Similarly, A blue filtered light image will cause the charge density on the photoconductive belt 20 to be reduced to a voltage level ineffective for development in the blue areas while the green and red portions of the spectrum will record as areas of relatively high charge density on photoconductive belt 20 to form a single color latent image corresponding to the subtractive primary of blue, i.e. yellow. The gray region of each latent image corresponds to the region wherein the charges on belt 20 for the red, green and blue filtered light images are proportional to one another in a fixed relationship. Thus, the regions of the resulting cyan, magenta and yellow latent images wherein the charge levels are proportional to one another in a fixed relationship are developed as gray.

In order to remove these regions from each latent image, it is necessary to determine the color components of the original document and to erase the gray regions from each latent image. This is accomplished by the raster scanning system. The raster scanning system includes a raster input scanner (RIS) 16, a raster output scanner (ROS) 18 and an image processing system (IPS) 50. The RIS has document illumination lamps, optics, a scanning drive, and photosensing elements, such as a CCD array, i.e. a charge coupled device. The RIS captures the entire image from the original document 38 and converts it to a series of raster scan lines which are transmitted as electrical signals to IPS 50. The electrical signals from the RIS correspond to the red, green and blue densities at each point in the document. The IPS compares the red, blue and green signals for each pixel in the original document. When the signal levels for the red, green and blue pixels are proportional to one another in a fixed relationship, the pixel will be developed as gray. Those pixels wherein at least one of the signals for red, green and blue do not correspond to this relationship correspond to a non-gray pixel. These signals are transmitted to ROS 18. ROS 16 includes a laser with rotating polygon mirror. The ROS 18 illuminates the charged portion of photoconductive belt 20 to discharge the latent images in the gray regions thereof. Thus, as the cyan latent image is being recorded on the photoconductive belt by the optical scanning system, the raster scanning system discharges those areas corresponding to the gray regions so as to remove the gray therefrom. This process is repeated for the magenta and yellow latent images. A fourth latent images is recorded on the photoconductive belt by the optical scanning system corresponding to any one of the subtractive primary colors, i.e. cyan, magenta, or yellow. The raster scanning system selectively discharges those regions of the fourth latent image wherein at least one of the red, blue or green signals do not satisfy the foregoing relationship. This results in a latent image corresponding to the gray regions of the original document being recorded on photoconductive belt 20.

After the electrostatic latent image has been recorded on photoconductive belt 20, belt 20 advances the electrostatic latent image to the development station. The development station includes four individual developer units generally indicated by the reference numerals 52, 54, 56 and 58. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 52, 54 and 56, respectively, apply toner particles of a specific color which corresponds to the complement of the specific color separated electrostatic latent image recorded on the photoconductive surface. The color of each of the toner particles is adapted to absorb light within a preselected spectral region of the electromagnetic wave spectrum. For example, the electrostatic latent formed by using a green filter is made visible by having developer unit 52 apply green absorbing (magenta) toner particles thereon. Similarly, a blue separation is developed by developer unit 54 with blue absorbing (yellow) toner particles, while the red separation is developed by developer unit 56 with red absorbing (cyan) toner particles. Developer unit 58 contains black toner particles and is used to develop the fourth electrostatic latent image corresponding to the black regions original document. Each of the developer units is moved into and out of the operative position. In the operative position, the magnetic brush is closely adjacent the photoconductive belt. In the non-operative position, the magnetic brush is spaced from the photoconductive belt. During development of each electrostatic latent image only one developer unit is in the operative position, the remaining developer units are in the non-operative position. This insures that each electrostatic latent image is developed with toner particles of the appropriate color without comingling. In FIG. 1, developer unit 52 is shown the operative position with developer units 54, 56 and 58 being in the non-operative position.

After development, the toner image is moved to the transfer station where the toner image is transferred to a sheet of support material, such as plain paper amongst others. At the transfer station, the sheet transport, indicated generally by the reference numeral 60, moves the sheet into contact with photoconductive belt 20. Sheet transport 60 has a pair of spaced belts 62 entrained about rolls 64 and 66. A gripper extends between belts 62 and moves in unison therewith. The sheet is advanced from a stack of sheets 68 disposed on a tray. A feed belt 70 advances the uppermost sheet from stack 68 onto a conveyor 72. Conveyor 72 advances the sheet to sheet transport 60. The sheet is advanced by conveyor 72 in synchronism with the movement of the gripper. In this way, the leading edge of the sheet arrives at a preselected position to be received by the open gripper. The gripper then closes securing the sheet thereto for movement therewith in a recirculating path. The leading edge of the sheet is secured releasably by the gripper. As the belts move in the direction of arrow 74, the sheet moves into contact with the photoconductive belt, in synchronism with the toner image developed thereon. At transfer zone 76, a corona generating device 78 sprays ions onto the backside of the sheet so as to charge the sheet to the proper magnitude and polarity for attracting the toner image from photoconductive belt 20 thereto. The sheet remains secured to the gripper so as to move in a recirculating path for four cycles. In this way, the cyan, yellow, magenta and black toner images are transferred to the sheet in superimposed registration with one another to form a multi-color copy of the colored original document.

After the last transfer operation, the grippers open and release the sheet. Conveyor 80 transports the sheet, in the direction of arrow 82, to the fusing station where the transferred image is permanently fused to the sheet. The fusing station includes a heated fuser roll 84 and a pressure roll 86. The sheet passes through the nip defined by fuser roll 84 and pressure roll 86. The toner image contacts fuser roll 84 so as to be affixed to the sheet. Thereafter, the sheet is advanced by forwarding roll pairs 88 to catch tray 90 for subsequent removal therefrom by the machine operator.

The last processing station in the direction of movement of belt 20, as indicated by arrow 22, is the cleaning station. A rotatably mounted fibrous brush 92 is positioned in the cleaning station and maintained in contact with photoconductive belt 20 to remove residual toner particles remaining after the transfer operation. Thereafter, lamp 94 illuminates photoconductive belt 20 to remove any residual charge remaining thereon prior to the start of the next successive cycle.

Referring now to FIG. 2, the exposure system is discussed in greater detail. As shown thereat, the exposure station includes an optical scanning system and a raster scanning system. The optical scanning system records color separated electrostatic latent images on photoconductive belt 12. The raster scanning system determined those regions of the latent images which correspond to the gray regions of the original document. In operation, an original document 38 is positioned face down upon transparent platen 40. Lamps 14, mirror 42, lens 10 and filter 12 move in synchronism with belt 20 to form a color separated light image which is projected by mirrors 44, 46 and 48 onto the charged portion of photoconductive belt 20. Filter 12 interposes red, green and blue optical filters in the path of the light image to form a color separated light image. The color separated light images discharge the charged regions of the photoconductive belt 20 to record single color electrostatic latent images thereon corresponding to the subtractive primary colors, Thus, cyan, magenta and yellow electrostatic latent images are recorded on the photoconductive belt. A fourth electrostatic latent image is also recorded thereon corresponding any one of the other single color electrostatic latent image. The RIS uses a CCD array having 3072 sites. A repeating pattern of red, green and blue filters are masked directly onto the chip, 1024 samples of each of the red, green and blue components. The RIS scans the original document and transmits red, green and blue signals to IPS 50. This architecture allows a simple form of black recognition. The IPS electronics look for a balance between the red, green and blue signals for each pixel. A gray area of the original document absorbs light at all frequencies in equal amounts. Therefore, the tone of the original document document from white through gray to black, will be reported by the IPS as those regions of the scanned image wherein the red, green and blue components are proportional to one another in a fixed relationship. The overall signal level indicates the grayness. The lower the signal level, the grayer the pixel. If each pixel is tagged, a full page bitmap is required. A full page bitmap requires a large amount of memory. In order to reduce the memory requirements, rectangular areas are tagged. The CCD array transmits pixel information to the IPS which records corners of rectangles to store this information as rectangular areas. Memory requirements are reduced by tagging rectangular areas rather than individual pixels. The IPS tags this area to indicate that it is some shade of gray. The IPS has a short term buffer to store a few scan lines from the RIS. This allows identification of the gray versus colored regions substantially simultaneously with the recording of the latent image by the optical scanning system. The buffer enables the associated logic sufficient time to decide whether to erase or allow printing of the associated part of the original document. Thus, the raster scanning system operates in parallel with the optical scanning system rather than in a sequential mode of operation. This increases the effective output of the printing machine by from about 25% to about 33%. The information from the IPS is transmitted to ROS 18 which uses this tag to fully discharge the photoconductive belt in the gray area. By way of example, the ROS includes a laser associated with a 9 facet, polygon and operates at 400 pixels per inch. The beam from ROS 18 is reflected by mirror 48 onto the gray regions of the electrostatic latent image recorded on photoconductive belt 20. Thus, the ROS erases the gray regions of the cyan, magenta, and yellow electrostatic latent images. Inerased areas are subsequently developed with cyan, magenta and yellow toner particles. For the fourth electrostatic latent image, i.e. on the black pass, the situation is reversed and all areas that are not part of the gray image are erased. Hence, on the black pass, the ROS uses the non-tagged areas to fully discharge the photoconductive belt in the non-gray areas. The unerased electrostatic latent image is then developed with black toner particles. Only the area of the original document that is truly black will be developed with black toner. Black areas on a white background will be recognized as being black. Black borders of colored areas will be reported as a grayer tone of the background color. These areas will be reproduced by the process black method. Other gray regions may similarly be reproduced by a combination of the process black method, i.e. superimposing cyan, magenta and yellow toner particles. If desired, the IPS will determine those pixels to be reproduced in black by determining when the red, green and blue signals are in balance, i.e. proportional to one another above a preselected level. When the signals are proportional to one another, but beneath the preselected level, the tagged areas may be reproduced by the process black method. This enables the IPS to distinguish between pictorial and text information. By the appropriate level selection, text may be reproduced by single pass black and pictorial information by process black.

In recapitulation, the electrophotographic printing machine of the present invention records color separated latent images on the photoconductive belt and, substantially simultaneously, erases the gray areas thereof. Three color separated latent images and a fourth latent image corresponding to the gray regions of the original document are recorded on the photoconductive belt. The color separated latent images are developed with cyan, magenta and yellow toner particles with the fourth latent image being developed with black toner particles. The toner powder images are transferred from the photoconductive belt to a sheet in superimposed registration with one another. The toner powder images are then fused to the sheet forming a multi-color copy of the original document. Thus, the present invention provides a technique for black recognition and, in parallel, black undercolor removal from latent image being recorded on the photoconductive belt.

It is, therefore, evident that there has been provided in accordance with the present invention, an electrophotographic printing machine which uses a single black pass in forming a multi-color copy that fully satisfies the aims and advantages hereinbefore set forth. While this invention has been described in conjuction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

We claim:

1. A color image processing apparatus, including:
   an image receiving member;
   means for supporting an original document;
   means for recording a latent image on said image receiving member corresponding to one of the color components of the original document on said supporting means;
   means for scanning the original document on said supporting means and detecting a plurality of color components of the original document to generate color signals representative of each one of the plurality of color components; and
   means, responsive to the color signals from said scanning means, for erasing, substantially simultaneously as the latent image is being recorded on the image receiving member, those regions of the latent image wherein the color signals from said scanning means have a preselected relationship relative to one another.

2. An apparatus according to claim 1, wherein said erasing means erases those regions of the latent image wherein the color signals from said scanning means have the preselected relationship of being at substantially the same level.

3. An apparatus according claim 1, wherein said erasing means erases those regions of the latent image wherein the color signals from said scanning means have the preselected relationship in which at least one of the color signals from said scanning means is at a diferent level than the other color signals.

4. An apparatus according to claim 1, wherein said scanning means detects three color components of the original document and generates color signals representative of each one of the color components.

5. An apparatus according to claim 4, wherein said recording means records a latent image on said image receiving member corresponding to a substractive primary color of one of the primary colors of the original document.

6. An apparatus according to claim 5, wherein said scanning means detects red, green and blue color components of the original document and generates color signals representative of each one of the color components.

7. An apparatus according to claim 6, wherein said recording means records latent images recorded on said image receiving member corresponding to the cyan, magenta and yellow subtractive primary colors of the original document.

8. An apparatus according to claim 7, wherein said erasing means erases those portions of the latent images recorded on said image receiving member wherein the red, green and blue color signals from said scanning means are proportional to one another in a fixed relationship to remove the black regions of the original document from the latent images recorded on said image receiving member.

9. An apparatus according to claim 8, wherein:
   said said recording means records a fourth latent image on said image receiving member corresponding to one of the subtractive primary colors of the original document; and
   said erasing means erases those portions of the fourth latent image recorded on said image receiving member wherein at least one of the red, green and blue color signals from said scanning means is at a different level than the other color signals therefrom so that the fourth latent image corresponds to the black regions of the original document.

10. An apparatus according to claim 4, wherein said scanning means includes a raster input scanner.

11. An apparatus according to claim 10, wherein said erasing means includes a raster output scanner.

12. An apparatus according to claim 11, wherein:
    said image receiving member includes a charged photoconductive member; and
    said recording means includes optical exposure means for projecting an optically filtered light image of the original document onto said said charged photoconductive member to record an electrostatic latent image thereon.

13. An electrophotographic printing machine of the type having a photoconductive member arranged to have a latent image of an original document recorded thereon, wherein the improvement includes:
    means for recording a latent image on photoconductive member member corresponding to one of the color components of the original document;
    means for scanning the original document and detecting a plurality of color components of the original document to generate color signals representative of each one of the plurality of color components; and
    means, responsive to the color signals from said scanning means, for erasing, substantially simultaneously as the latent image is being recorded on the photoconductive member, those regions of the latent image wherein the color signals from said scanning means have a preselected relationship relative to one another.

14. An electrophotographic printing machine according claim 13, wherein said erasing means erases those regions of the latent image wherein the color signals from said scanning means have the preselected relationship of being at substantially the same level.

15. An electrophotographic printing machine according claim 13, wherein said erasing means erases those regions of the latent image wherein the color signals from said scanning means have the preselected relationship in which at least one of the color signals from said scanning is at a different levels than the other color signals.

16. An electrophotographic pringing machine according to claim 13, wherein said scanning means detects three color components of the original document and generates color signals representative of each one of the color components.

17. An electrophotographic printing machine according to claim 16, wherein said recording means records a latent image on the photoconductive member corresponding to a subtractive primary color of one of the primary colors of the original document.

18. An electrophotographic printing machine according to claim 17, wherein said scanning means detects red, green and blue color components of the original document and generates color signals representative of each one of the color components.

19. An electrophotographic printing machine according to claim 18, wherein said recording means records latent images recorded on the photoconductive member corresponding to the cyan, magenta and yellow subtractive primary colors of the original document.

20. An electrophotographic printing machine according to claim 19, wherein said erasing means erases those portions of the latent images recorded on the photoconductive member wherein the red, green and blue color signals from said scanning means are proportional to one another in a fixed relationship to remove the black regions of the original document from the latent images recorded on the photoconductive member.

21. An electrophotographic printing machine according to claim 20, wherein:
said said recording means records a fourth latent image on the photoconductive member corresponding to one of the subtractive primary colors of the original document; and
said erasing means erases those portions of the fourth latent image recorded on the photoconductive member wherein at least one of the red, green and blue color signals from said scanning means is at a different level than the other color signals therefrom so that the fourth latent image corresponds to the black regions of the original document.

22. An electrophotographic printing machine according to claim 17, wherein said scanning means includes a raster input scanner.

23. An electrophotographic printing machine according to claim 22, wherein said erasing means includes a raster output scanner.

24. An electrophotographic printing machine according to claim 23 wherein said recording means includes:
means for charging the photoconductive member; and
optical exposure means for projecting an optically filtered light image of the original document onto the charged photoconductive member to record a latent image thereon.

25. An electrophotographic printing machine according to claim 24, further including:
means for developing the latent images recorded on the photoconductive member corresponding to the cyan, magenta and yellow subtractive primary colors of the original document with cyan, magenta and yellow developer material, and the fourth latent image with black developer material to form cyan, magenta, yellow and black developed images on the photoconductive member;
means for transferring the cyan, magenta, yellow and black developed images from the photoconductive member to a sheet in superimposed registration with one another; and
means for fusing the developed images transferred to the sheet to form a multi-color copy of the original document.

* * * * *